(12) United States Patent
Obara et al.

(10) Patent No.: US 9,647,737 B2
(45) Date of Patent: May 9, 2017

(54) RADIO COMMUNICATION CONTROL METHOD AND RADIO COMMUNICATION SYSTEM

(71) Applicant: NTT DOCOMO, INC., Tokyo (JP)

(72) Inventors: Tatsunori Obara, Tokyo (JP); Satoshi Suyama, Tokyo (JP); Jiyun Shen, Tokyo (JP); Yukihiko Okumura, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 15/111,495

(22) PCT Filed: Feb. 19, 2015

(86) PCT No.: PCT/JP2015/054684
§ 371 (c)(1),
(2) Date: Jul. 14, 2016

(87) PCT Pub. No.: WO2015/125891
PCT Pub. Date: Aug. 27, 2015

(65) Prior Publication Data
US 2016/0359533 A1 Dec. 8, 2016

(30) Foreign Application Priority Data
Feb. 21, 2014 (JP) ................................. 2014-032011

(51) Int. Cl.
*H04B 7/02* (2006.01)
*H04B 7/0456* (2017.01)
*H04B 7/0408* (2017.01)
*H04B 7/06* (2006.01)
*H04B 7/08* (2006.01)

(52) U.S. Cl.
CPC ......... *H04B 7/0456* (2013.01); *H04B 7/0408* (2013.01); *H04B 7/0617* (2013.01); *H04B 7/0848* (2013.01)

(58) Field of Classification Search
CPC . H04B 1/40; H04B 3/23; H04B 1/403; H04B 3/54; H04L 27/2601; H04L 1/0025; H04L 25/4902; H04L 1/0009; H04L 1/0041; H04L 25/49; H04L 27/2647; H04L 5/0007; H04L 27/2657; H04L 27/2662; H04L 5/0048; H04L 1/0003; H04L 1/0071
USPC ................ 375/267, 260, 259, 295, 316, 219
See application file for complete search history.

(56) References Cited

FOREIGN PATENT DOCUMENTS

| JP | 2013179423 A | 9/2013 |
|----|--------------|--------|
| JP | 2013232741 A | 11/2013 |

OTHER PUBLICATIONS

International Search Report issued in corresponding application No. PCT/JP2015/054684 mailed Apr. 7, 2015 (2 pages).
(Continued)

*Primary Examiner* — Zewdu Kassa
(74) *Attorney, Agent, or Firm* — Osha Liang LLP

(57) ABSTRACT

BF weight vector determination is executed for each of M number of streams. In a first stage, by repeating switching of transmission BF weight (transmission beam) candidates in a small base station, a transmission BF weight vector with the best reception quality in a user apparatus UE is selected from among tried transmission BF weight vectors. In a second stage, by repeating switching of reception BF weight (reception beam) candidates in the user apparatus, a reception BF weight vector with the best reception quality in the user apparatus UE is selected from among tried reception BF weight vectors.

6 Claims, 8 Drawing Sheets

(56) References Cited

OTHER PUBLICATIONS

Written Opinion of the International Searching Authority issued in corresponding application No. PCT/JP2015/054684 mailed Apr. 7, 2015 (3 pages).
Kim et al., "Multi-Beam Transmission Diversity with Hybrid Beamforming for MIMO-OFDM Systems"; Globecom Workshop—Emerging Technologies for LTE-Advanced and Beyond-4G; IEEE 2013; pp. 61-65 (5 pages).

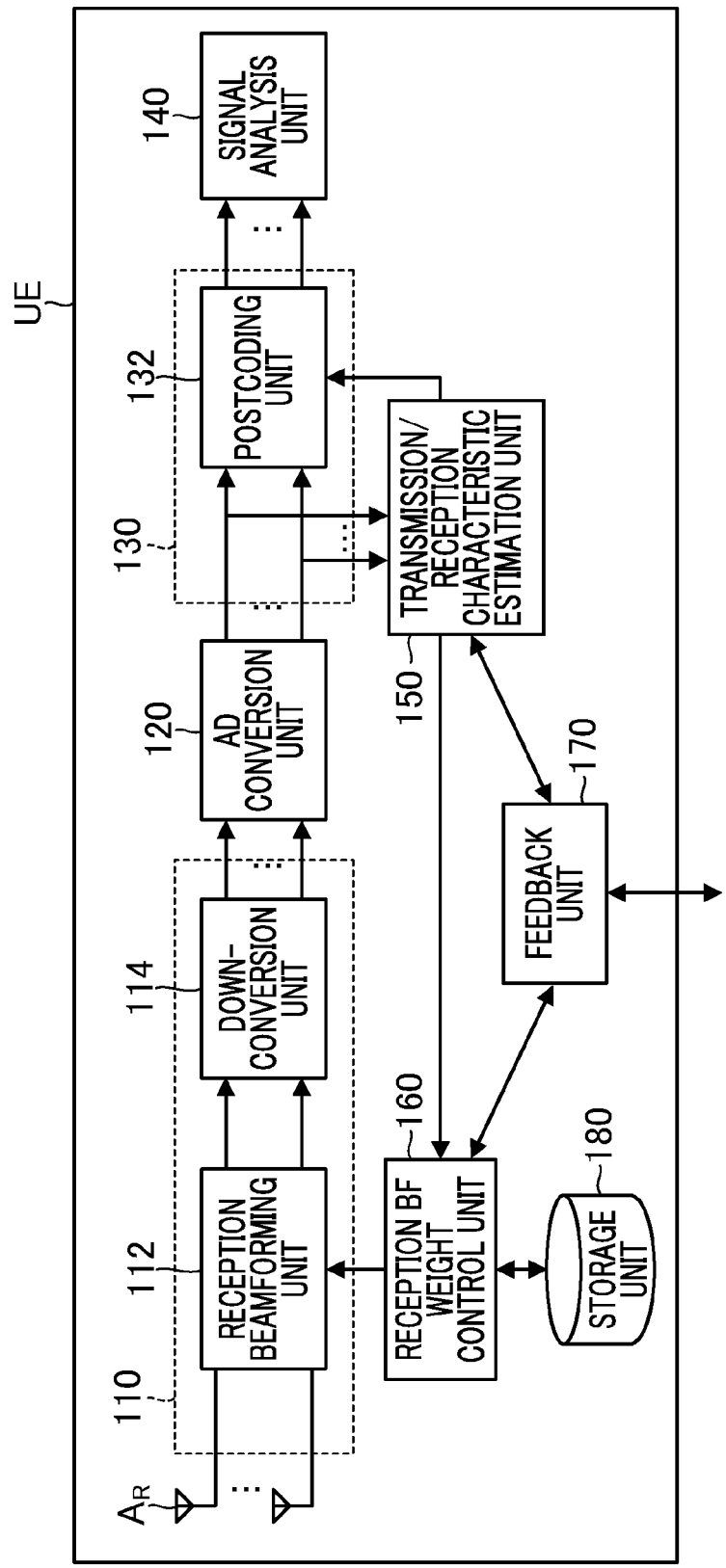

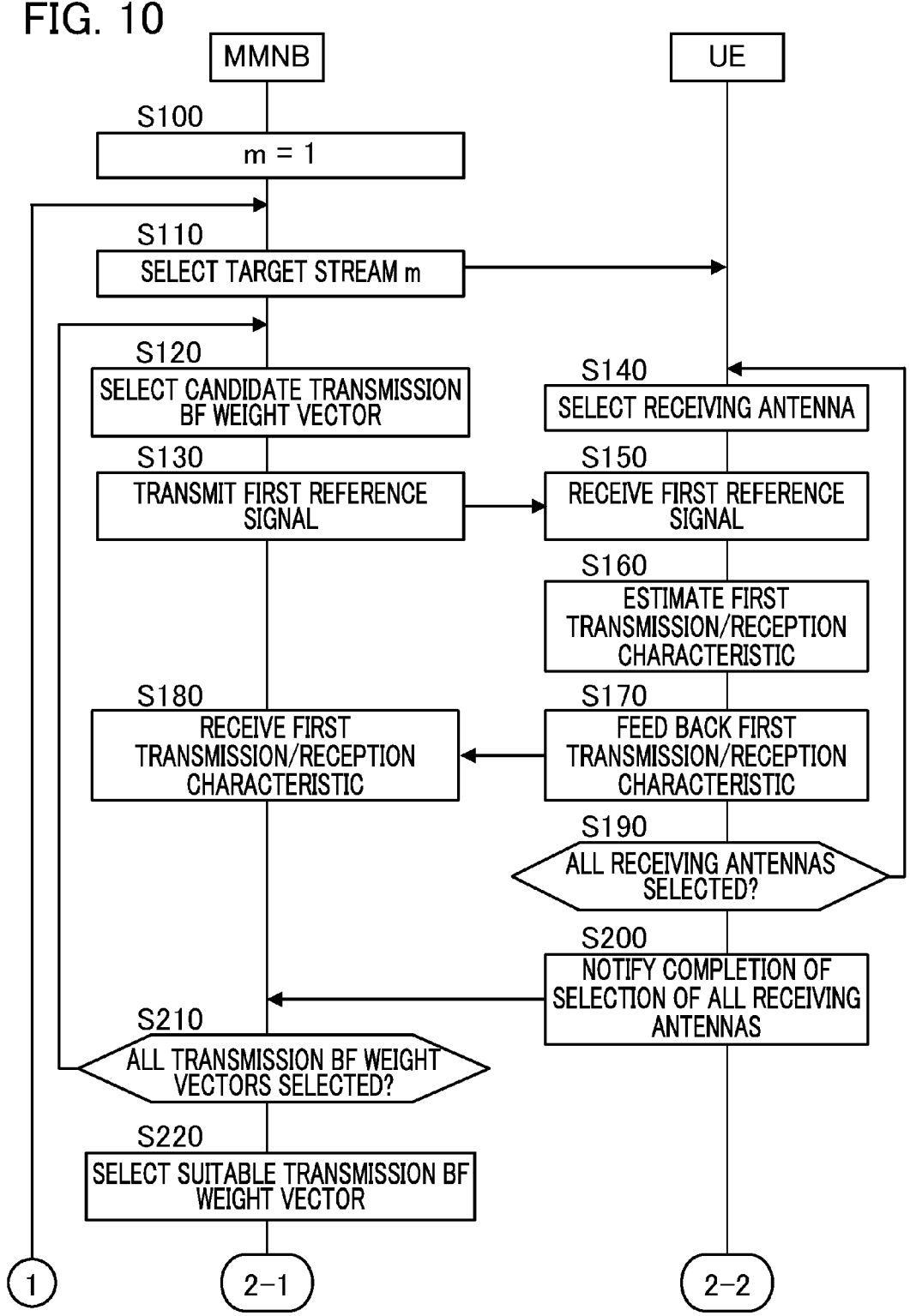

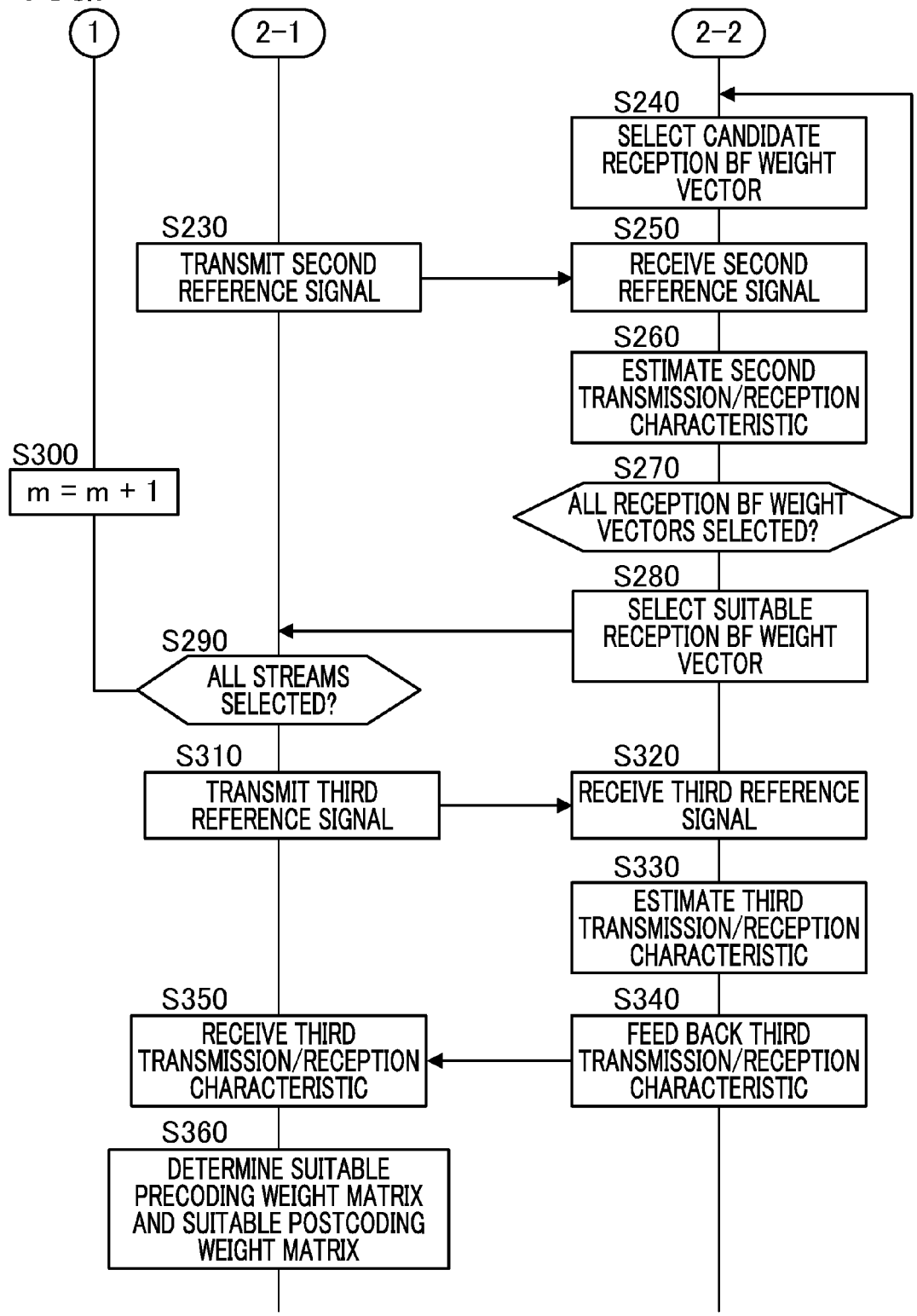

RADIO COMMUNICATION CONTROL METHOD AND RADIO COMMUNICATION SYSTEM

TECHNICAL FIELD

The present invention relates to a radio communication control method and to a radio communication system.

BACKGROUND ART

In recent years, a MIMO (Multiple-Input and Multiple-Output) transmission scheme is utilized in a radio communication field. The MIMO transmission scheme accomplishes high-speed and high-quality signal transmission by using multiple antennas, both at a transmitter and at a receiver, to execute transmission and reception.

In order to achieve higher-speed signal transmission and interference reduction, a Massive-MIMO transmission scheme is under study (e.g., Patent Document 1). In the Massive-MIMO transmission scheme, a large number of antenna elements (e.g., 100 elements or more) are used in a high frequency band (e.g., 10 GHz or higher) with which downsizing of antennas and securing of a wide bandwidth are possible.

In Massive-MIMO, advanced beamforming (BF) can be accomplished using a larger number of antenna elements compared with conventional MIMO. Beamforming is a technology in which the directivity and/or shape of beams (a transmission beam corresponding to a transmitting antenna or a reception beam corresponding to a receiving antenna) are controlled by controlling multiple antennas elements. In MIMO, because the phase and the amplitude can be controlled for each antenna element, the degree of freedom in controlling beams increases with the number of antenna elements that are used.

The beamforming that is performed on a transmission signal can be mathematically expressed as multiplication of a vector that indicates the transmission signal by a beamforming weight matrix (hereinafter, may be referred to as a BF weight matrix). A BF weight matrix can be expressed as a matrix that includes multiple beamforming weight vectors (hereinafter, may be referred to as BF weight vectors) as components. Hereinafter, the term "BF weight" may be used as a generic term for a BF weight matrix and a BF weight vector.

RELATED ART DOCUMENT

Patent Document

Patent Document 1: Japanese Patent Application Laid-Open Publication No. 2013-232741

SUMMARY OF INVENTION

Problem to be Solved by the Invention

In order to execute MIMO transmission appropriately, it is considered important to execute beamforming appropriately, that is, to determine a suitable BF weight. It is assumed that, in order to determine a BF weight, a large amount of operation processing is performed such as, for example, executing channel estimation for all combination patterns using all the candidate BF weights and comparing the channel estimation results to select an optimum BF weight. If operations are executed for all the combination patterns, however, the load of the operation processing becomes excessive. In particular, because a large number of antenna elements are used in the Massive-MIMO transmission scheme, the aforementioned problem of the increase in processing load becomes more prominent.

In consideration of the above circumstances, an object of the present invention is to determine a suitable BF weight to accomplish appropriate MIMO transmission while reducing the operation amount.

Means of Solving the Problems

A radio communication control method according to the present invention is a radio communication control method in a radio communication system including a transmitter and a receiver, the transmitter including: a precoding unit that performs digital precoding on M (where M is an integer of 2 or more) number of streams using a precoding weight matrix; a transmission beamforming unit that performs, on a signal on which the digital precoding has been performed, analog transmission beamforming that imparts, to the signal, changes in phase and amplitude corresponding to a transmission BF (beamforming) weight matrix; and multiple transmitting antennas that transmit the signal on which the analog transmission beamforming has been performed, the receiver including: multiple receiving antennas that receive a signal that is transmitted from the transmitter and is propagated through space; a reception beamforming unit that performs, on the signal received by the multiple receiving antennas, analog reception beamforming that imparts, to the signal received by the multiple receiving antennas, changes in phase and amplitude corresponding to a reception BF weight matrix; and a postcoding unit that reproduces the M number of streams by performing, using a postcoding weight matrix, digital postcoding on the signal on which the analog reception beamforming has been performed. The radio communication control method includes: for each of the M number of streams, selecting a candidate transmission BF weight vector corresponding to the stream from multiple transmission BF weight vector candidates; transmitting, from the transmitter, a first reference signal on which analog transmission beamforming has been performed based on a candidate transmission BF weight matrix that includes the selected candidate transmission BF weight vector; estimating a first transmission/reception characteristic that represents a result of performing, on the first reference signal that is received by the receiver, analog reception beamforming based on a test reception BF weight matrix; determining a suitable transmission BF weight vector from the multiple transmission BF weight vector candidates based on multiple first transmission/reception characteristics acquired by executing the selecting, the transmitting, and the estimating for the multiple transmission BF weight vector candidates; selecting a candidate reception BF weight vector corresponding to the stream from multiple reception BF weight vector candidates; transmitting, from the transmitter, a second reference signal on which analog transmission beamforming has been performed based on a test transmission BF weight matrix that includes the determined suitable transmission BF weight vector; estimating a second transmission/reception characteristic that represents a result of performing, on the second reference signal received by the receiver, analog reception beamforming based on a candidate reception BF weight matrix that includes the selected candidate reception BF weight vector; and determining a suitable reception BF weight vector from the multiple reception BF weight vector candidates based on multiple second transmission/reception characteristics acquired by executing the selecting, the transmitting, and the estimating for the multiple reception BF weight vector candidates.

A radio communication system according to the present invention includes a transmitter and a receiver, the transmitter including: a precoding unit that performs digital precoding on M (where M is an integer of 2 or more) number of streams using a precoding weight matrix; a transmission beamforming unit that performs, on a signal on which the digital precoding has been performed, analog transmission beamforming that imparts, to the signal, changes in phase and amplitude corresponding to a transmission BF (beamforming) weight matrix; and multiple transmitting antennas that transmit the signal on which the analog transmission beamforming has been performed, the receiver including: multiple receiving antennas that receive a signal that is transmitted from the transmitter and is propagated through space; a reception beamforming unit that performs, on the signal received by the multiple receiving antennas, analog reception beamforming that imparts, to the signal received by the multiple receiving antennas, changes in phase and amplitude corresponding to a reception BF weight matrix; and a postcoding unit that reproduces the M number of streams by performing, using a postcoding weight matrix, digital postcoding on the signal on which the analog reception beamforming has been performed. The radio communication system further includes: a transmission BF weight control unit that selects, for each of the M number of streams, a candidate transmission BF weight vector corresponding to the stream from multiple transmission BF weight vector candidates and directs the transmitter to transmit a first reference signal on which analog transmission beamforming has been performed based on a candidate transmission BF weight matrix that includes the selected candidate transmission BF weight vector; and a transmission/reception characteristic estimation unit that estimates a first transmission/reception characteristic that represents a result of analog reception beamforming performed on the first reference signal received by the receiver based on a test reception BF weight matrix. The transmission BF weight control unit determines a suitable transmission BF weight vector from the multiple transmission BF weight vector candidates based on multiple first transmission/reception characteristics estimated by the transmission/reception characteristic estimation unit for the multiple transmission BF weight vector candidates. The radio communication system further includes a reception BF weight control unit that selects, for each of the M number of streams, a candidate reception BF weight vector corresponding to the stream from multiple reception BF weight vector candidates. The transmission BF weight control unit directs the transmitter to transmit a second reference signal on which analog transmission beamforming has been performed based on a test transmission BF weight matrix that includes the suitable transmission BF weight vector determined by the transmission BF weight control unit. The transmission/reception characteristic estimation unit estimates a second transmission/reception characteristic that represents a result of analog reception beamforming performed on the second reference signal received by the receiver based on a candidate reception BF weight matrix that includes the candidate reception BF weight vector selected by the reception BF weight control unit. The reception BF weight control unit determines a suitable reception BF weight vector from the multiple reception BF weight vector candidates based on multiple second transmission/reception characteristics estimated by the transmission/reception characteristic estimation unit for the multiple reception BF weight vector candidates.

Effect of the Invention

According to the present invention, the weight matrices are determined stepwise for each stream. That is, a suitable transmission BF weight and a suitable reception BF weight are determined first. Accordingly, compared with a configuration in which a BF weight is determined after all the combinations of the weight matrices are tried, the number of combinations to be operated can be reduced. As a result, the suitable BF weight matrix is determined while the operation amount required for weight matrix determination is reduced.

BRIEF DESCRIPTION OF THE DRAWINGS

FIG. 9 is a functional block diagram of a user apparatus of the embodiment.

FIG. 10 is a portion of an operation flowchart showing BF weight determination of the embodiment.

FIG. 11 is a portion of the operation flowchart showing BF weight determination of the embodiment.

MODES FOR CARRYING OUT THE INVENTION

1. Embodiment

1(1). Massive-MIMO Transmission

A Massive-MIMO transmission scheme according to an embodiment of the present invention will be described. In a Massive-MIMO transmission scheme in which a base station executes radio communication using multiple transmitting antennas $A_T$, a high radio communication speed (data rate) can be accomplished by multiplexing. Furthermore, because the degree of freedom in antenna control when beamforming is performed increases, more advanced beamforming than before can be accomplished. Reduction in an interference amount and/or effective utilization of a radio resource can therefore be accomplished. The number of transmitting antennas $A_T$ that are provided in a base station adapted to Massive-MIMO is not limited to the following, but is preferably 32 or more, 64 or more, 96 or more, 100 or more, 128 or more, 192 or more, 200 or more, 256 or more, 500 or more, 512 or more, 1000 or more, or 1024 or more.

In the Massive-MIMO transmission scheme, preferably, a high frequency band (e.g., frequency band of 10 GHz or more) is used. In a high frequency band, it is easier to secure a radio resource of wider bandwidth (e.g., 200 MHz or more) than in a low frequency band. Moreover, because the size of an antenna element is proportional to the signal wavelength, the antenna can be further downsized when a high frequency band, for which a radio signal wavelength is relatively short, is used. On the other hand, the propagation loss increases as the frequency becomes higher. Even if a radio signal is transmitted from the base station with the same transmission power, the reception signal strength in a mobile station is lower when the signal is transmitted using a high frequency band than when a low frequency band is used.

Figure 1:
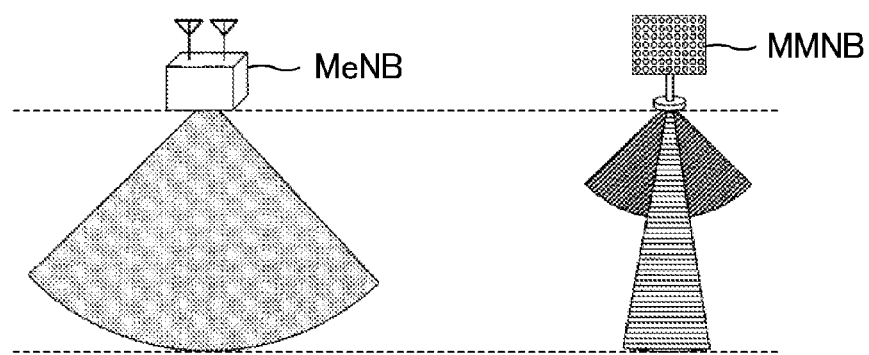
FIG. 1 is a schematic diagram for describing a Massive-MIMO transmission scheme according to an embodiment.

The reduction in the reception signal strength by use of a high frequency band, as described above, can be compensated by a beamforming gain. FIG. 1 is a diagram schematically showing a reachable range of a beam (radio signal) depending on the frequency. Because a conventional base station (macro base station MeNB) performs radio communication using a low frequency band, even when a beam having a wide radiation pattern is used, the beam can reach further. Whereas, because a base station (small base station MMNB) that conforms to the Massive-MIMO transmission scheme of the present embodiment performs radio communication using a high frequency band, when a beam having a wide radiation pattern is used, the reachable distance of the beam is shorter than that of the macro base station MeNB. When the width of a radiation pattern of the beam is narrowed by beamforming, however, even the small base station MMNB, which uses a high frequency band, can have its beam reach long distances.

Figure 2:
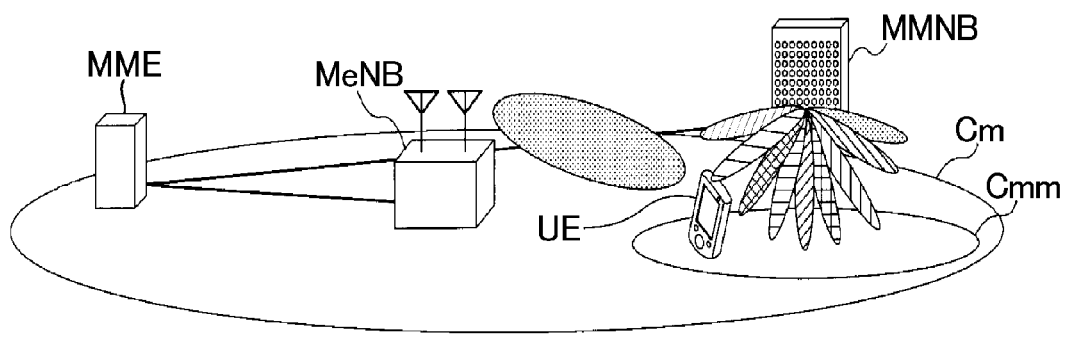
FIG. 2 is a schematic configuration diagram of a radio communication system according to the embodiment.

FIG. 2 is a schematic configuration diagram of a radio communication system 1 according to the embodiment. The radio communication system 1 includes a macro base station MeNB, a small base station MMNB, a central control station MME, and a user apparatus UE. The small base station MMNB is a base station that conforms to the Massive-MIMO transmission scheme.

The macro base station MeNB forms a macro cell Cm around it, and the small base station MMNB forms a Massive-MIMO cell (MM cell) Cmm around it. The frequency band used by the small base station MMNB (e.g., 10 GHz band) is higher in frequency and has a greater propagation loss than the frequency band used by the macro base station MeNB (e.g., 2 GHz band). The cell size of the MM cell Cmm is thus smaller than the cell size of the macro cell Cm. The small base station MMNB and the user apparatus UE are therefore highly likely to be connected by a line-of-sight.

As shown in FIG. 2, the MM cell Cmm can overlap with an area in which radio communication is provided by another radio access technology (RAT), such as the macro cell Cm. As a result, multiple connectivity by multiple radio access technologies is supported for a user apparatus UE that is located in an overlapping area. Furthermore, it is possible to transmit a control signal to a user apparatus UE that is in communication with the small base station MMNB, which conforms to the Massive-MIMO transmission scheme, from the macro base station MeNB, which conforms to a different radio access technology. Examples of another radio access technology includes a public or local wireless LAN.

As described above, in Massive-MIMO transmission in which a high frequency band is used, it is preferable that the propagation loss is compensated by a gain that is accomplished by beamforming. Furthermore, in order to accomplish higher-speed radio communication, it is preferable that multiple data streams are spatially multiplexed to be transmitted. In the multiplexed transmission as described above, in addition to controlling a beam itself by beamforming, it is more preferable that compensation for inter-stream multiplexing is accomplished by precoding.

Figure 3:
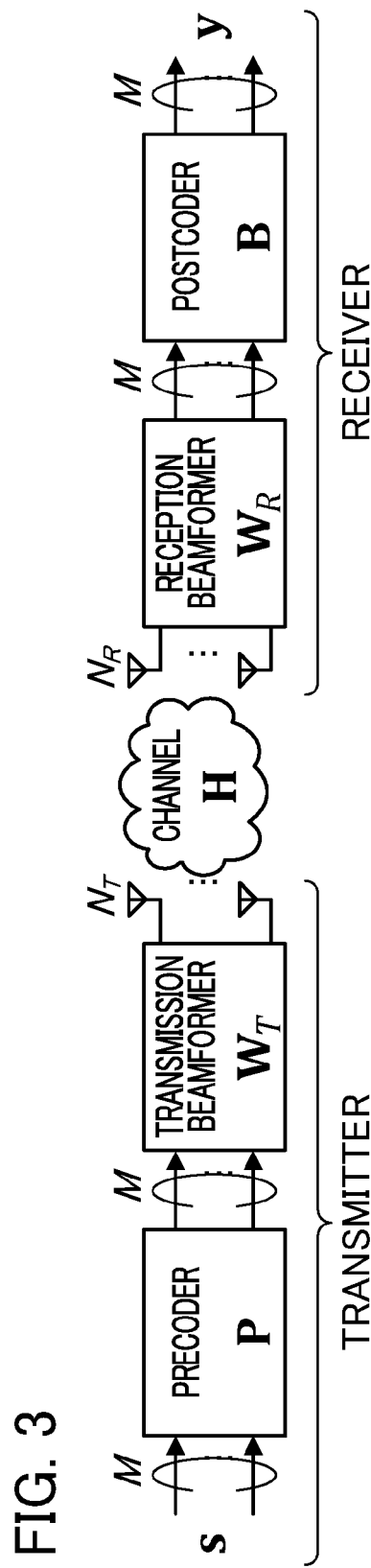
FIG. 3 is a diagram showing a functional configuration of Massive-MIMO transmission according to the embodiment.

More specifically, as shown in FIG. 3, it is preferable that a precoder and a transmission beamformer in a transmitter (e.g., small base station MMNB) respectively execute precoding and transmission beamforming, and a reception beamformer and a postcoder in a receiver (e.g., user apparatus UE) respectively execute reception beamforming and postcoding.

The precoding processing is, mathematically speaking, processing in which an M-row 1-column signal vector S that represents M (M is an integer of 2 or more, e.g., M=16) number of streams is multiplied by an M-row M-column precoding weight matrix P. The transmission beamforming processing is processing in which the signal on which precoding has been performed is multiplied by an $N_T$-row M-column ($N_T$ is the number of transmitting antennas, e.g., $N_T$=256) transmission BF (beamforming) weight matrix $W_T$. The signal that is transmitted from the transmitting antennas $A_T$ after undergoing transmission beamforming is multiplied by an $N_R$-row $N_T$-column ($N_R$ is the number of receiving antennas, e.g., $N_R$=16) channel characteristic matrix H that corresponds to spatial propagation. The reception beamforming processing is processing in which the signal received by the receiving antennas $A_R$ is multiplied by an M-row $N_R$-column reception BF weight matrix $W_R$. The postcoding processing is processing in which the signal on which reception beamforming has been performed is multiplied by an M-row M-column postcoding weight matrix B. After undergoing postcoding, an M-row 1-column signal vector y can be expressed by the following equation.

$$y = B W_R H W_T P s + n \qquad (1)$$

The term n that is added in the above equation (1) is an M-row 1-column noise vector.

Figure 4:
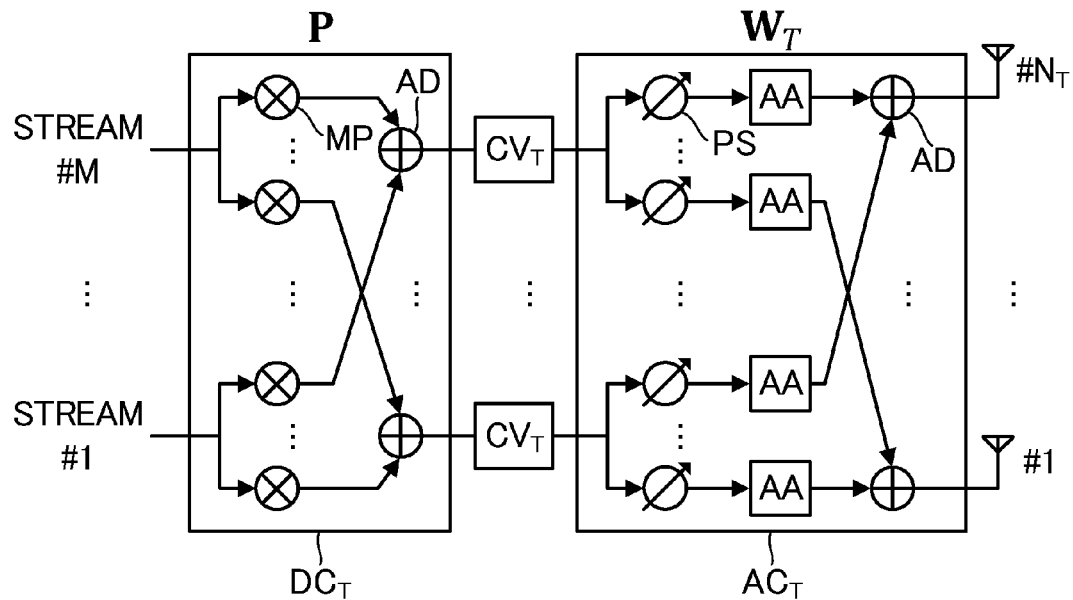
FIG. 4 is a diagram showing an exemplary circuit configuration of a transmitter according to the embodiment.
Figure 5:
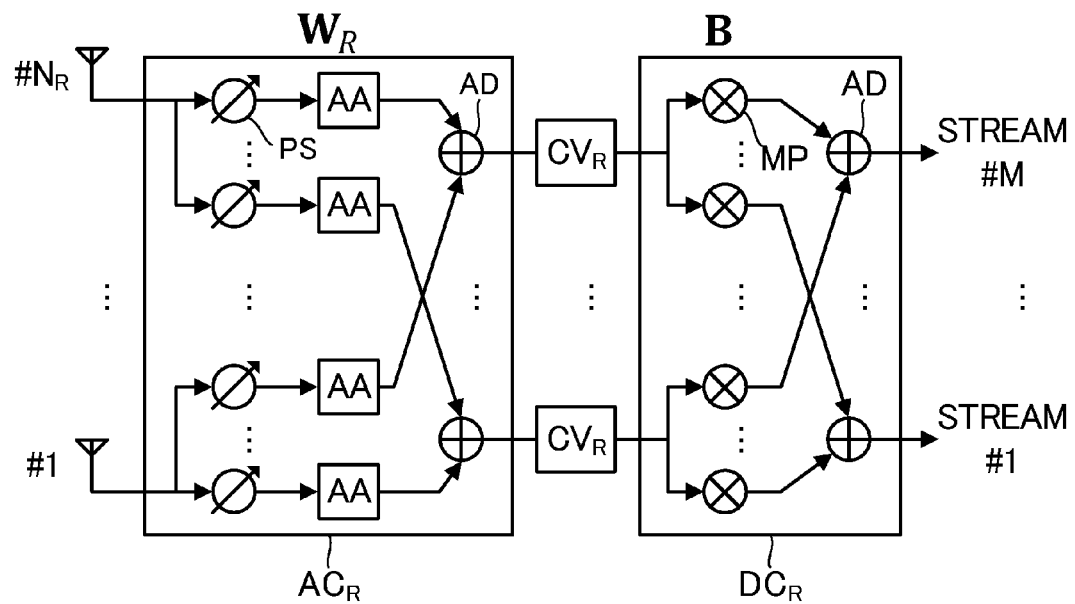
FIG. 5 is a diagram showing an exemplary circuit configuration of a receiver according to the embodiment.

In this embodiment, as a more preferable mode of the Massive-MIMO transmission, digital precoding is used for precoding, analog beamforming is used for transmission and reception beamforming, and digital postcoding is used for postcoding. A non-limiting example of a specific circuit configuration is shown in FIGS. 4 and 5. FIG. 4 shows an equivalent circuit on the transmitter side, and FIG. 5 shows an equivalent circuit on the receiver side.

As shown in FIG. 4, on the transmitter side, after precoding (matrix operation) is digitally performed on M number of streams by a digital signal processing circuit $DC_T$ that includes multiple multipliers MP and adders AD, DA conversion and up conversion are executed by converters $CV_T$, and a high frequency transmission signal is generated. The high frequency transmission signal is transmitted from $N_T$ number of transmitting antennas $A_T$ after changes in the phase and the amplitude are imparted thereto by an analog signal processing circuit $AC_T$ that includes adders AD and includes at least one of variable-phase shifters PS or amplitude adjusters AA (i.e., after transmission beamforming is performed in an analog manner on the high frequency transmission signal).

As shown in FIG. 5, on the receiver side, changes in the phase and the amplitude are imparted to a high frequency reception signal received by the $N_R$ number of receiving antennas $A_R$ by an analog signal processing circuit $AC_R$ that includes variable-phase shifters PS, amplitude adjusters AA, and adders AD (i.e., reception beamforming is performed in an analog manner on the high frequency reception signal). Then, on the signal that has undergone reception beamforming, AD conversion and down conversion are executed by converters $CV_R$ and postcoding (matrix operation) is digitally performed by a digital signal processing circuit $DC_R$. As a result, M number of streams are generated (reproduced).

The analog signal processing circuits AC ($AC_T$ or $AC_R$) may serve as any of multiple beam candidates (BF weight candidates) by using the variable-phase shifters PS and the amplitude adjusters AA, as described above, or may be configured to include multiple processing circuits corresponding to the multiple beam candidates, any of the multiple processing circuits being selected by a control switch.

The above configuration is particularly preferable in the Massive-MIMO transmission scheme in which the number of transmitting antennas $N_T$ is sufficiently large relative to the number of streams M that are to be transmitted (i.e., $M \ll N_T$). In general, when the number of transmission streams M is less than the number of transmitting antennas $N_T$, an $N_T$-row M-column matrix operation is needed prior to radio signal transmission to convert M number of stream components into $N_T$ number of transmitting antenna components. In this embodiment, as described above, mathematically speaking, the M number of stream components are converted into the $N_T$ number of transmitting antenna components by matrix operation with the M-row M-column precoding weight matrix P and the $N_T$-row M-column transmission BF weight matrix $W_T$.

In the above configuration, on the transmission side, precoding alone is executed by the digital signal processing circuit $DC_T$. Compared with a configuration in which both precoding and transmission beamforming are processed digitally, the circuit scale of and the operation amount in the digital signal processing circuit $DC_T$ can thus be reduced. Moreover, the number of channels for a DA converter (converters $CV_T$) can also be reduced. Accordingly, both simplification of the configuration and usage of multiple transmitting antennas $A_T$ are accomplished. It is similar for the reception side (postcoding and reception beamforming).

1(2). Determination of Weight Matrix

The aforementioned weight matrices (P, $W_T$, $W_R$, B) are used in signal processing in the Massive-MIMO transmission. The channel capacity C in the Massive-MIMO transmission can be calculated using these weight matrices by the following equation (2).

$$C = \log_2 det(I + \gamma B W_R H W_T P P^H W_T^H H^H W_R^H B^H) \quad (2)$$

In equation (2) (modified Shannon equation), I is a unit matrix and γ is a reception SNR (Signal-to-Noise Ratio). The $(.)^H$ indicates a conjugate transpose matrix.

By selecting appropriate weight matrices from multiple candidates, it is possible to increase (preferably, maximize) the channel capacity C. In an example of a conventional technology, a combination of optimum weight matrices is determined by performing trials for all the combinations in which one candidate weight matrix is selected from each of the multiple weight matrices.

More specifically, in a case in which the number of streams is M, the number of candidates of the precoding weight matrix P is $N_P$, the number of candidates of the transmission BF weight matrix (transmission beam pattern) $W_T$ is $N_{WT}$, the number of candidates of the reception BF weight matrix (reception beam pattern) $W_R$ is $N_{WR}$, and the number of candidates of the postcoding weight matrix B is $N_B$, the operations need to be performed $N_P \cdot (N_{WT})^M \cdot (N_{WR})^M \cdot N_B$ number of times. The number of antennas in the Massive-MIMO transmission scheme is large compared with the conventional MIMO transmission scheme, and thus the number of candidate beam patterns is large. If the above-mentioned manner of combination determination is used, therefore, there arises a problem that the operation amount increases in geometric progression and the processing load increases.

In a configuration in which analog beamforming is used, because the channel matrix H itself cannot be observed, radio signals need to be actually transmitted or received to measure a transmission characteristic.

In view of the above situation, in this embodiment, instead of performing trials for all the combinations of the weight matrices, the transmission BF weight matrix $W_T$ and the reception BF weight matrix $W_R$ are determined first, and then the precoding weight matrix P and the postcoding weight matrix B are determined using the determined BF weight matrices. By determining the weight matrices stepwise as described above, the number of combinations that are to be operated is reduced, and consequently the operation amount can be reduced.

In the Massive-MIMO transmission scheme, since the number of antennas of the transmitter (small base station MMNB) is large relative to the number of the antennas of the receiver (user apparatus UE), larger transmission beamforming gain can be obtained. Accordingly, in this embodiment, the transmission BF weight is determined first, and then the reception BF weight is determined.

Figure 6:
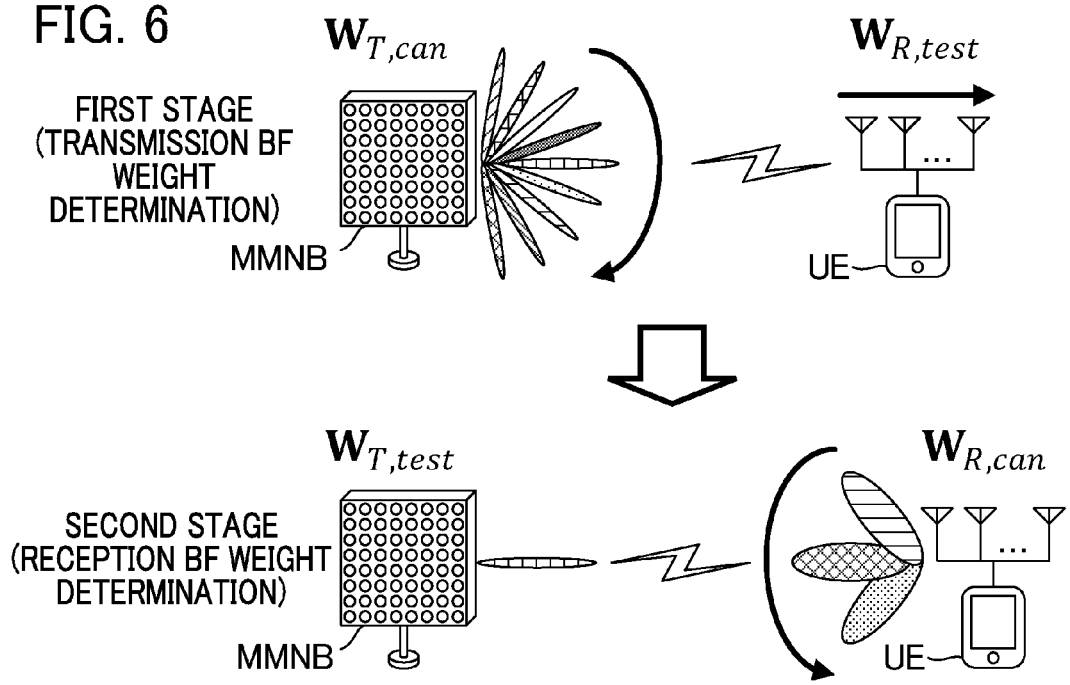
FIG. 6 is a diagram for schematically describing BF weight determination according to the embodiment.

FIG. 6 is a diagram for schematically describing BF weight determination according to the present embodiment. The BF weight determination is executed for each of the M number of streams sequentially. In a first stage, by repeating switching of transmission BF weight (transmission beam) candidates in the small base station MMNB and switching of the receiving antennas $A_R$ in the user apparatus UE, the transmission BF weight with which the best reception quality in the user apparatus UE is obtained is selected from among the tried combinations of the transmission BF weights and the receiving antennas $A_R$. In a second stage, by repeating switching of reception BF weight (reception beam) candidates in the user apparatus UE, the reception BF weight with which the best reception quality in the user apparatus UE is obtained is selected from among the tried reception BF weights. In the second stage, the small base station MMNB changes the amplitude and the phase of the transmission signals based on the transmission BF weight selected in the first stage.

Figure 7:
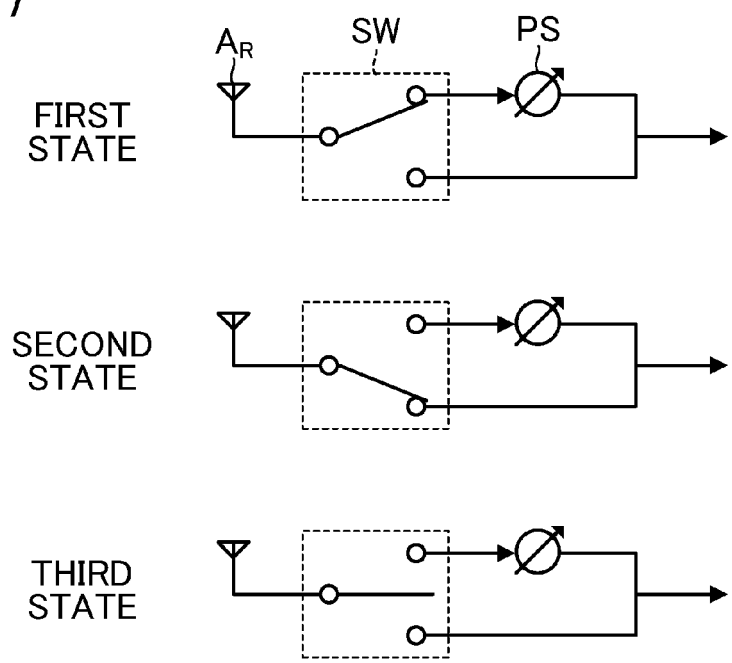
FIG. 7 is a configuration diagram of a switching circuit according to the embodiment.

FIG. 7 is a configuration diagram of a switching circuit that accomplishes switching of receiving antennas $A_R$ in the user apparatus UE. In FIG. 7, as described above (such as FIG. 5), a receiving antenna $A_R$ and a variable-phase shifter PS connected thereto are shown (illustration of the amplitude adjuster AA and adder AD in the downstream are omitted for brevity). In addition, a switching device SW is provided between the receiving antenna $A_R$ and the variable-phase shifter PS. The switching device SW is in one of the following states: a first state (connected state) in which the amplitude and the phase of a reception signal are changed by connecting the receiving antenna $A_R$ and the variable-phase shifter PS, etc.; a second state (bypass state) in which the variable-phase shifter PS, etc. are bypassed; or a third state (unconnected state) in which the receiving antenna $A_R$ is not connected to anywhere. Each of the receiving antennas $A_R$ is provided with the aforementioned switching device SW.

Details of the BF weight determination of the present embodiment are specifically described below with reference to FIGS. 8 to 12.

Figure 8:
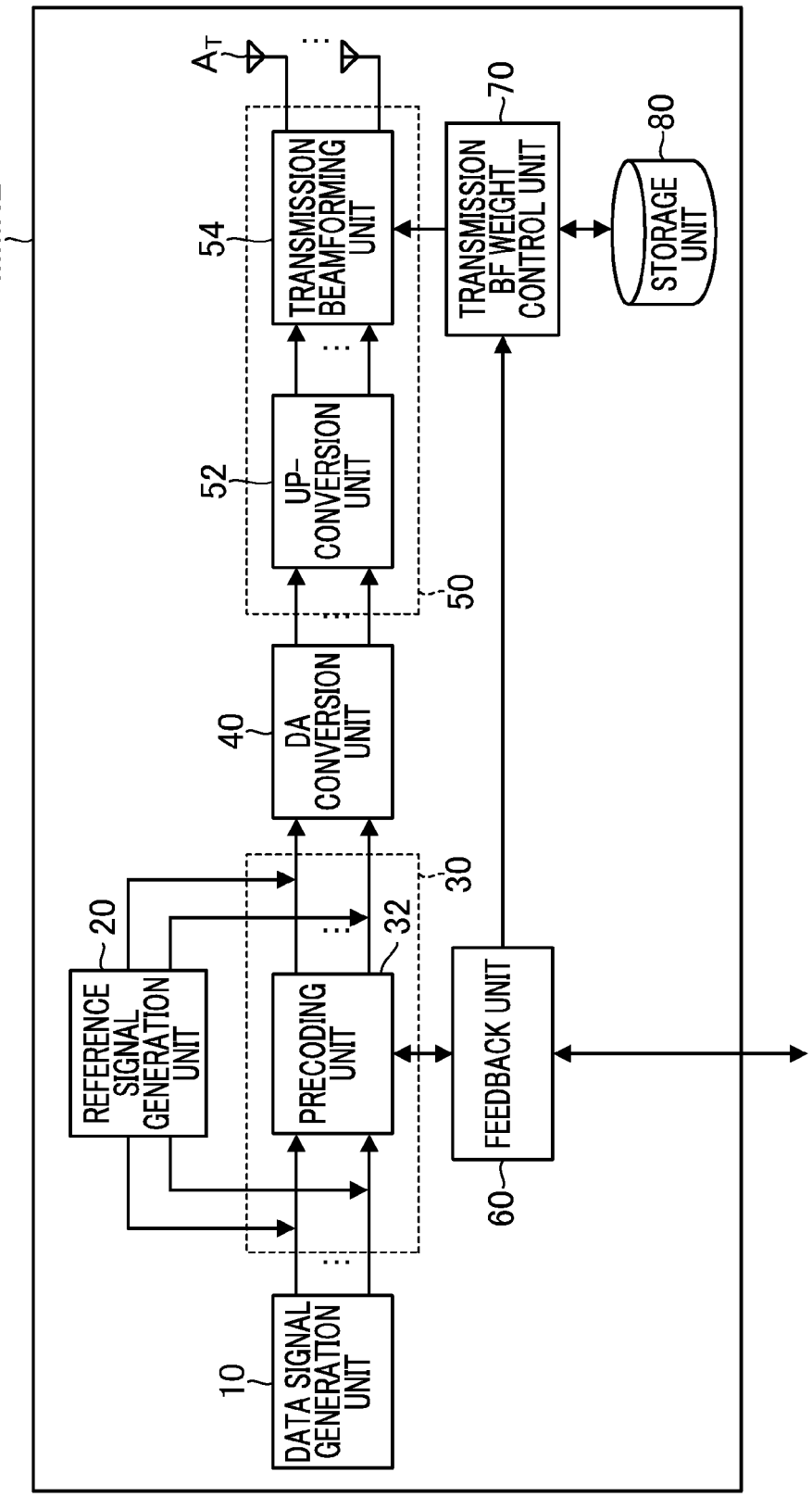
FIG. 8 is a functional block diagram of a small base station of the embodiment.

FIG. 8 is a functional block diagram showing main elements of the small base station MMNB (transmitter) of the embodiment. The small base station MMNB includes a data signal generation unit 10, a reference signal generation unit 20, a baseband processing unit 30, a DA conversion unit 40, an RF processing unit 50, a feedback unit 60, a transmission BF weight control unit 70, and a storage unit 80. The baseband processing unit 30 includes a precoding unit 32. The RF processing unit 50 includes an up-conversion unit 52 and a transmission beamforming unit 54. The $N_T$ number of transmitting antennas $A_T$ are connected to the transmission beamforming unit 54.

The data signal generation unit 10 generates a data signal to be included in a transmission signal to the user apparatus UE. The data signal generation unit 10 can generate the data signal as streams of multiple sequences. In this embodiment, the data signal generation unit 10 is assumed to generate the data signal of M (M is an integer of 2 or more) number of streams. The reference signal generation unit 20 generates a reference signal to be included in the transmission signal to the user apparatus UE. The reference signal is a signal that is used for initial synchronization between the user apparatus UE and the small base station MMNB, and/or for identifying the small base station MMNB in the user apparatus UE, for example. The reference signal generation unit 20 also can generate the reference signal of multiple sequences (M number of streams). The generated data signal and the reference signal are input into the baseband processing unit 30 as baseband signals.

The baseband processing unit 30 is an element that processes an input baseband signal (data signal or reference signal). The baseband processing unit 30 includes the precoding unit 32 that performs digital precoding (matrix operation) on the M number of streams using the M-row M-column precoding weight matrix P.

In normal radio transmission, a signal in which the data signal and the reference signal are combined is precoded in the precoding unit 32 and output from the baseband processing unit 30. In the BF weight determination of the present embodiment, a reference signal that has not been precoded is output from the baseband processing unit 30. The multiple sequences included in the reference signal that is used in the BF weight determination of the present embodiment are orthogonal to each other.

The DA conversion unit 40 converts the digital signal output from the baseband processing unit 30 into an analog signal and outputs the analog signal to the RF processing unit 50.

The RF processing unit 50 is an element that processes an input analog signal and transmits the processed signal from the transmitting antennas $A_T$. The RF processing unit 50 includes the up-conversion unit 52 that frequency-converts an input analog signal into an RF signal of a radio frequency. The RF processing unit 50 also includes the transmission beamforming unit 54 that performs analog transmission beamforming on the signal that has undergone frequency conversion based on the $N_T$-row M-column transmission BF weight matrix $W_T$. A high frequency signal that is output from the transmission beamforming unit 54 is transmitted from the $N_T$ number of transmitting antennas $A_T$. The above analog transmission beamforming is processing in which changes in phase and amplitude corresponding to the multiplication by the transmission BF weight matrix are imparted to the M number of analog signals using the variable-phase shifters PS and the amplitude adjusters AA. In other words, in the above analog transmission beamforming, the phases and the amplitudes of the multiple transmitting antennas (signals that are to be transmitted from the multiple transmitting antennas $A_T$) change in an analog manner such that the changes correspond to the multiplication by the transmission BF weight matrix.

The feedback unit 60 is an element that performs control-related communication with the user apparatus UE. In particular, the feedback unit 60 supplies feedback information from the user apparatus UE to the precoding unit 32 and the transmission BF weight control unit 70. The transmission BF weight control unit 70 controls the BF weight that is used in the transmission beamforming unit 54. The storage unit 80 stores information such as information relating to the control of the radio communication (e.g., BF weight).

Among the elements included in the small base station MMNB, elements that execute digital processing (e.g., data signal generation unit 10, reference signal generation unit 20, baseband processing unit 30, feedback unit 60, and transmission BF weight control unit 70) are functional blocks that are accomplished by a CPU (Central Processing Unit), which is not shown in the figure, executing a computer program stored in the storage unit 80 and functioning in accordance with the computer program.

FIG. 9 is a functional block diagram showing main elements of the user apparatus UE (receiver) of the embodiment. The user apparatus UE includes an RF processing unit 110, an AD conversion unit 120, a baseband processing unit 130, a signal analysis unit 140, a transmission/reception characteristic estimation unit 150, a reception BF weight control unit 160, a feedback unit 170, and a storage unit 180. The RF processing unit 110 includes a reception beamforming unit 112 and a down-conversion unit 114, and the baseband processing unit 130 includes a postcoding unit 132. The $N_R$ number of receiving antennas $A_R$ are connected to the reception beamforming unit 112.

A radio signal that is transmitted from the small base station MMNB serving as a transmitter and is propagated through space is received by the $N_R$ number of receiving antennas $A_R$ and is input into the RF processing unit 110.

The RF processing unit 110 is an element that processes the signal received by the multiple receiving antennas $A_R$. The RF processing unit 110 includes the reception beamforming unit 112 that performs analog reception beamforming on the received signal based on the M-row $N_R$-column reception BF weight matrix $W_R$. The RF processing unit 110 also includes the down-conversion unit 114 that frequency-converts an input signal into a baseband signal and outputs the baseband signal. The above analog reception beamforming is processing in which the changes in phase and amplitude corresponding to the multiplication by the reception BF weight matrix are imparted to the $N_R$ number of analog signals using the variable-phase shifters PS and the amplitude adjusters AA. In other words, in the above analog reception beamforming, the phases and the amplitudes of the multiple receiving antennas $A_R$ (signals received by the multiple receiving antennas $A_R$) change in an analog manner such that the changes correspond to the multiplication by the reception BF weight matrix.

The reception beamforming unit 112 can execute the switching of the receiving antennas $A_R$ described with reference to FIG. 7. A receiving antenna $A_R$ in the first state (connected state) is connected to the variable-phase shifter PS in the reception beamforming unit 112, a receiving antenna $A_R$ in the second state (bypass state) is connected to a bypass circuit in the reception beamforming unit 112, and a receiving antenna $A_R$ in the third state (unconnected state) is not connected to either of the above. Signals that have passed through the variable-phase shifter PS and the amplitude adjuster AA and signals that have bypassed without passing through the variable-phase shifter PS and the amplitude adjuster AA are all input into the down-conversion unit 114.

The AD conversion unit 120 converts an analog signal that is output from the RF processing unit 110 into a digital signal and outputs the digital signal to the baseband processing unit 130.

The baseband processing unit 130 is an element that processes the input baseband signal to retrieve the M number of streams. The baseband processing unit 130 includes the postcoding unit 132 that performs digital postcoding (matrix operation) on the signal that is output from the AD conversion unit 120 using the M-row M-column postcoding weight matrix B. As a result of the above postcoding, the M number of streams are reproduced. The reproduced M number of streams are input into the signal analysis unit 140 and analyzed.

The transmission/reception characteristic estimation unit 150 executes estimation of transmission/reception characteristics described later. The reception BF weight control unit 160 controls the BF weight that is used in the reception beamforming unit 112. The feedback unit 170 is an element that performs control-related communication with the small base station MMNB. In particular, the feedback unit 170 transmits feedback information from the transmission/reception characteristic estimation unit 150 and from the reception BF weight control unit 160 to the small base station MMNB. The storage unit 180 stores information relating to radio communication control (e.g., BF weight).

Among the elements included in the user apparatus UE, elements that execute digital processing (e.g., baseband processing unit 130, signal analysis unit 140, transmission/reception characteristic estimation unit 150, reception BF weight control unit 160, and feedback unit 170) are functional blocks that are accomplished by a CPU, which is not shown in the figure, executing a computer program stored in the storage unit 180 and functioning in accordance with the computer program.

FIGS. 10 and 11 are operation flowcharts showing the BF weight determination of the present embodiment. In summary, according to the BF weight determination of the present embodiment, as a result of executing a first stage (determination of a suitable transmission BF weight vector, steps S120 to S220) and a second stage (determination of a suitable reception BF weight vector, steps S230 to S280) for each of the M number of streams, a suitable (i.e., optimum in the tried range) transmission BF weight matrix $$W_T = [w_{T,1}, w_{T,2}, \ldots, w_{T,M}]$$

and a suitable reception BF weight matrix $$W_R = \begin{bmatrix} w_{R,1}^T \\ w_{R,2}^T \\ \vdots \\ w_{R,M}^T \end{bmatrix}$$

are determined.

The $$w_R = \begin{bmatrix} w_{T,m,1} \\ w_{T,m,2} \\ \vdots \\ w_{T,m,N_T} \end{bmatrix}$$

included in the transmission BF weight matrix is an $N_T$-row 1-column transmission analog BF weight vector corresponding to the m-th stream. The $$w_{R,m} = \begin{bmatrix} w_{R,m,1} \\ w_{R,m,2} \\ \vdots \\ w_{R,m,N_R} \end{bmatrix}$$

included in the reception BF weight matrix is an $N_R$-row 1-column reception analog BF weight vector corresponding to the m-th stream.

The BF weight determination will be described below in detail. When the BF weight determination is started, the transmission BF weight control unit 70 in the small base station MMNB designates and selects the first stream (m=1) from among the M number of streams (S100 and S110). The stream m selected in step S110 may be referred to as a "target stream m" in the following description.

The transmission BF weight control unit 70 selects a candidate transmission BF weight vector $w_{T,can}$ that corresponds to the target stream (m=1) from multiple (X number of) transmission BF weight vector candidates (S120). Next, the transmission BF weight control unit 70 directs the transmission beamforming unit 54 to impart, to a reference signal, changes in phase and amplitude that correspond to an $N_T$-row M-column candidate transmission BF weight matrix $$W_{T,can} = [w_{T,can}, 0_{N_T}, \ldots, 0_{N_T}]$$

that includes the selected candidate transmission BF weight vector (i.e., to perform analog transmission beamforming on the reference signal) and to transmit the reference signal from the $N_T$ number of transmitting antennas $A_T$ (S130). Here, the $0_{N_T}$ is an $N_T$-row 1-column zero vector. As described above, in the BF weight determination, a reference signal that is not precoded undergoes transmission beamforming and then is transmitted. In the following, the reference signal that is transmitted in step S130 may be referred to as a first reference signal RS1.

The information indicating the target stream m that is selected in step S110 is also notified to the user apparatus UE via the feedback unit 60. After receiving the notification, the reception BF weight control unit 160 in the user apparatus UE directs the reception beamforming unit 112 to select at least one receiving antenna $A_R$ that is to receive the first reference signal RS1 (S140). In this example, a single, the $n_r$-th receiving antenna $A_R$ is selected.

The reception BF weight control unit 160 directs the reception beamforming unit 112 to impart, to the first reference signal RS1 that is received by the selected receiving antenna $A_R$, changes in phase and amplitude that correspond to an M-row $N_R$-column test reception BF weight matrix $$W_{R,test} = \begin{bmatrix} 1_{n_r}^T \\ 0_{N_R}^T \\ \vdots \\ 0_{N_R}^T \end{bmatrix}$$

(i.e., to perform analog reception beamforming on the first reference signal RS1) (S150). Here, the $1_{n_r}$ is an $N_R$-row 1-column unit vector in which the $n_r$-th element that is an index of the selected receiving antenna $A_R$ is 1 (corresponding to the second state (bypass state) of the switching device SW) and the other elements are 0 (corresponding to the third state (unconnected state) of the switching device SW). The $0_{N_R}$ is an $N_R$-row 1-column zero vector.

The first reference signal RS1 received in the reception beamforming unit 112 is input into the transmission/reception characteristic estimation unit 150 via the down-conversion unit 114 and the AD conversion unit 120. The transmission/reception characteristic estimation unit 150 estimates an M-row M-column transmission/reception characteristic $$\tilde{H} = W_R H W_T$$

using the input first reference signal RS1 (S160). The above transmission/reception characteristic is a characteristic matrix that shows changes in a signal due to transmission beamforming, spatial propagation (channel matrix), and reception beamforming. The above transmission/reception characteristic estimation is executed in a manner similar to conventional channel estimation. For example, transmission/reception characteristic estimation using a least squares technique can be used. In the following, the transmission/reception characteristic estimated in step S160 may be referred to as a first transmission/reception characteristic.

The estimated first transmission/reception characteristic is fed back from the user apparatus UE via the feedback unit 170 (S170) and is received by the small base station MMNB (S180).

The first transmission/reception characteristic for the selected receiving antenna $A_R$ is estimated by the above steps S140 to S180. The above steps are repeated until all the receiving antennas $A_R$ are selected. That is, if the reception BF weight control unit 160 judges that not all the receiving antennas $A_R$ have been selected in step S190 (S190: NO), the processing returns to step S140 and a new receiving antenna $A_R$ is selected, and the first transmission/reception characteristic for the new receiving antennas $A_R$ is estimated. As a result, the first transmission/reception characteristic is estimated for each of the receiving antennas $A_R$. In this example in which the receiving antennas $A_R$ are selected one by one, the above steps are repeated $N_R$ number of times, the $N_R$ indicating the number of receiving antennas $A_R$.

If it is judged that all the receiving antennas $A_R$ have been selected (S190: YES), the reception BF weight control unit 160 notifies the small base station MMNB via the feedback unit 170 that the selection of all the receiving antennas $A_R$ is completed (S200).

By the above steps S120 to S200, the first transmission/reception characteristic corresponding to each of the receiving antennas $A_R$ is estimated for the selected candidate transmission BF weight vector. The above steps are repeated until all the transmission BF weight vector candidates are selected. That is, if the transmission BF weight control unit 70 judges that not all the transmission BF weight vector candidates have been selected in step S210 (S210: NO), the processing returns to step S120 and a new candidate transmission BF weight vector is selected, and the first transmission/reception characteristic corresponding to each of the receiving antennas $A_R$ is estimated for the new candidate transmission BF weight vector. In this example in which X number of transmission BF weight vector candidates exist, the above steps are repeated X number of times.

The M-row M-column first transmission/reception characteristic $\tilde{H}$ is acquired for each of all the combinations of the transmission BF weight vector candidates and the receiving antennas $A_R$ by executing steps S120 to S210 as described above.

The transmission BF weight control unit 70 determines a suitable transmission BF weight vector $w_{T,opt,1}$ from among the multiple transmission BF weight vector candidates based on the multiple ($N_R \cdot X$ number of) first transmission/reception characteristics acquired for the target stream (m=1) (S220). The suitable transmission BF weight vector can be determined based on a freely-chosen criterion. For example, the transmission BF weight vector candidate $w_{T,can}$ that corresponds to the first transmission/reception characteristic $\tilde{H}$ whose Frobenius norm $$\|\tilde{H}\|_F = \sqrt{\sum_{j=1}^{M}\sum_{i=1}^{M} |\tilde{H}_{i,j}|^2},$$

which correlates with the total of reception power values of all the streams, is the largest can be determined as the suitable transmission BF weight vector. The $\tilde{H}_{i,j}$ in the Frobenius norm indicates an (i, j) component of the first transmission/reception characteristic $\tilde{H}$. The criterion for determining the suitable transmission BF weight vector is not limited to the Frobenius norm. A scalar value that represents a feature of the first transmission/reception characteristic can be used as the criterion for determining the suitable transmission BF weight vector. Alternatively or additionally, a transmission BF weight vector with which reception power of the streams is maximized or a transmission BF weight vector with which the orthogonality between the streams is maximized may be used as the suitable transmission BF weight vector.

As described above, a single suitable transmission BF weight vector for the target stream (m=1) is determined by executing steps S110 to S220. The user apparatus UE is notified by the small base station MMNB that the suitable transmission BF weight vector has been determined.

The operation flowchart of the BF weight determination continues to the flowchart shown in FIG. 11. The transmission BF weight control unit 70 directs the transmission beamforming unit 54 to impart, to a reference signal, changes in phase and amplitude that correspond to an $N_T$-row M-column test transmission BF weight matrix $$W_{T,test} = [w_{T,opt,1}, 0_{N_T}, \ldots, 0_{N_T}]$$

that includes the suitable transmission BF weight vector $w_{T,opt,1}$ determined in step S220 (i.e., to perform analog transmission beamforming on the reference signal) and to transmit the reference signal from the $N_T$ number of transmitting antennas $A_T$ (S230). In a manner similar to that described above, a reference signal that is not precoded undergoes transmission beamforming and is transmitted. In the following, the reference signal that is transmitted in step S230 may be referred to as a second reference signal RS2.

The reception BF weight control unit 160 selects a candidate reception BF weight vector $w_{R,can}$ that corresponds to the target stream (m=1) from multiple (Y number of) reception BF weight vector candidates (S240). Next, the reception BF weight control unit 160 directs the reception beamforming unit 112 to impart, to the second reference signal RS2 received by the receiving antennas $A_R$, changes in phase and amplitude that correspond to an M-row $N_R$-column candidate reception BF weight matrix $$W_{R,can} = \begin{bmatrix} w_{R,can}^T \\ 0_{N_R}^T \\ \vdots \\ 0_{N_R}^T \end{bmatrix}$$

that includes the selected candidate reception BF weight vector (i.e., to perform analog reception beamforming on the second reference signal RS2) (S250).

The second reference signal RS2 received in the reception beamforming unit 112 is input into the transmission/reception characteristic estimation unit 150 via the down-conversion unit 114 and the AD conversion unit 120. The transmission/reception characteristic estimation unit 150 estimates an M-row M-column transmission/reception characteristic $$\tilde{H} = W_R H W_T$$

using the input second reference signal RS2 (S260). Description similar to that in step S160 can be applied to the above transmission/reception characteristic. In the following, the transmission/reception characteristic estimated in step S260 may be referred to as a second transmission/reception characteristic.

By the above steps S240 to S260, the second transmission/reception characteristic is estimated for the selected candidate reception BF weight vector. The above steps are repeated until all the reception BF weight vector candidates are selected. That is, if the reception BF weight control unit 160 judges that not all the reception BF weight vector candidates have been selected in step S270 (S270: NO), the processing returns to step S240 and a new candidate reception BF weight vector is selected, and the second transmission/reception characteristic is estimated for the new candidate reception BF weight vector. In this example in which Y number of reception BF weight vector candidates exist, the above steps are repeated Y number of times.

As described above, the M-row M-column second transmission/reception characteristic $\tilde{H}$ is acquired for each of all the reception BF weight vector candidates by executing steps S240 to S270.

The reception BF weight control unit 160 determines a suitable reception BF weight vector $w_{R,opt,1}$ from among the multiple reception BF weight vector candidates based on the multiple (Y number of) second transmission/reception characteristics acquired for the target stream (m=1) (S280). In a manner similar to that for the suitable transmission BF weight vector, the suitable reception BF weight vector can be determined based on a freely-chosen criterion (e.g., a scalar value representing a feature of the second transmission/reception characteristic).

As described above, a single suitable reception BF weight vector is determined for the target stream (m=1) by executing step S110 and steps S230 to S280. The determined suitable reception BF weight vector is fed back from the user apparatus UE to the small base station MMNB.

When there are other streams for which the suitable reception BF weight vectors and the suitable reception BF weight vectors are to be determined, the above steps S110 to S280 are repeated. That is, if the transmission BF weight control unit 70 judges that not all the streams (1 to M) have been selected in step S290 (S290: NO), a next stream m is designated (m=m+1) in step S300. The processing then returns to step S110 and a new target stream m (2, 3, . . . , M) is selected. Then, steps S110 to S280 are executed for the selected stream m.

Steps S110 to S280 of the second time onward are executed in a manner basically similar to steps S110 to S280 of the first time described above. Points different from the first time are described below.

In the transmission beamforming in step S130, the suitable transmission BF weight vectors $w_{T,opt,1}, \ldots, w_{T,opt,m-1}$ that have been already determined are used respectively for the first to the (m−1)-th streams, and the candidate transmission BF weight vector $w_{T,can}$ is used for the target stream m, in a manner similar to that described above. Accordingly, in step S130, the transmission BF weight control unit 70 directs the transmission beamforming unit 54 to perform transmission beamforming on the first reference signal based on the candidate transmission BF weight matrix $$W_{T,can} = [w_{T,opt,1}, \ldots, w_{T,opt,m-1}, w_{T,can}, 0_{N_T}, \ldots, 0_{N_T}]$$

and to transmit the first reference signal.

In the reception beamforming in step S150, the suitable reception BF weight vectors $w_{R,opt,1}, \ldots, w_{R,opt,m-1}$ that have already been determined are used respectively for the first to the (m−1)-th streams, and a unit vector $1_{n_r}$ in which the $n_r$-th element corresponding to the selected receiving antenna $A_R$ is 1 is used for the target stream m, in a manner similar to that described above. Accordingly, in step S150, the reception BF weight control unit 160 directs the reception beamforming unit 112 to perform analog reception beamforming on the first reference signal RS1 based on the following test reception BF weight matrix.

$$W_{R,test} = \begin{bmatrix} w_{R,opt,1}^T \\ \vdots \\ w_{R,opt,m-1}^T \\ 1_{n_r}^T \\ 0_{N_R}^T \\ \vdots \\ 0_{N_R}^T \end{bmatrix}$$

The suitable transmission BF weight vector determined in step S220 is generalized and expressed as $w_{T,opt,m}$.

In the transmission beamforming in step S230, the suitable transmission BF weight vectors that have already been determined for the first to the m-th streams are used. Accordingly, the test transmission BF weight matrix in step S230 is expressed as follows.

$$W_{T,test} = [w_{T,opt,1}, \ldots, w_{T,opt,m-1}, w_{T,opt,m}, 0_{N_T}, \ldots, 0_{N_T}]$$

In the reception beamforming in step S250, the suitable reception BF weight vectors $w_{R,opt,1}, \ldots, w_{R,opt,m-1}$ that have already been determined are used respectively for the first to the (m−1)-th streams, and the candidate reception BF weight vector $w_{R,can}$ is used for the target stream m, in a manner similar to that described above. Accordingly, the candidate reception BF weight matrix in step S250 is expressed as follows.

$$W_{R,can} = \begin{bmatrix} w_{R,opt,1}^T \\ \vdots \\ w_{R,opt,m-1}^T \\ w_{R,can}^T \\ 0_{N_R}^T \\ \vdots \\ 0_{N_R}^T \end{bmatrix}$$

The suitable reception BF weight vector determined in step S280 is generalized and expressed as $w_{R,opt,m}$.

As described above, steps S110 to S280 of the second time onward differ from steps S110 to S280 of the first time in that, in beamforming, the analog beamforming is executed based on the suitable transmission BF weight vectors and the suitable reception BF weight vectors (hereinafter, may be collectively referred to as suitable BF weight vectors) that have already been determined.

A configuration may be used in which, without using the suitable BF weight vectors that have been determined as described above, zero vectors are used in a manner similar to that in steps S110 to S280 of the first time. Note that, as a result of using the suitable BF weight vectors that have been determined, a suitable BF weight vector with which higher capacity can be obtained can be determined for the target stream m. This is because, when the suitable BF weight vector is determined for the target stream m, influence of the BF weights that have already been determined for the other streams (e.g., orthogonality of the streams) is taken into consideration.

As a result of the above steps S110 to S290 being executed M number of times, the suitable BF weight vector is determined for each of the M number of streams. Furthermore, a suitable transmission BF weight matrix $w_{T,opt}$ that includes the suitable transmission BF weight vectors and a suitable reception BF weight matrix $w_{R,opt}$ that includes the suitable reception BF weight vectors are determined.

Next, a suitable precoding weight matrix $P_{opt}$ and a suitable postcoding weight matrix $B_{opt}$ are determined based on the determined suitable transmission BF weight matrix and the suitable reception BF weight matrix (hereinafter, may be collectively referred to as suitable BF weight matrices). A specific description is given below.

The transmission BF weight control unit 70 in the small base station MMNB directs the transmission beamforming unit 54 to perform analog transmission beamforming on a reference signal based on the suitable transmission BF weight matrix and to transmit the reference signal from $N_T$ number of transmitting antennas $A_T$ (S310). In the following, the reference signal transmitted in step S310 may be referred to as a third reference signal RS3.

The reception BF weight control unit 160 in the user apparatus UE directs the reception beamforming unit 112 to perform analog reception beamforming on the third reference signal RS3 received by the receiving antennas $A_R$ based on the suitable reception BF weight matrix (S320).

The third reference signal RS3 received in the reception beamforming unit 112 is input into the transmission/reception characteristic estimation unit 150 via the down-conversion unit 114 and the AD conversion unit 120. The transmission/reception characteristic estimation unit 150 estimates an M-row M-column third transmission/reception characteristic $$\tilde{H} = W_{R,opt} H W_{T,opt}$$

using the input third reference signal RS3 (S330). Description similar to that in step S160 can be applied to the above third transmission/reception characteristic. The estimated third transmission/reception characteristic is fed back from the user apparatus UE via the feedback unit 170 (S340) and is received by the small base station MMNB (S350).

Then, the suitable precoding weight matrix and the suitable postcoding weight matrix are determined based on the estimated third transmission/reception characteristic (S360). A more specific description follows. The third transmission/reception characteristic is expressed as the equation (3) below when singular value decomposition is performed thereon.

$$\tilde{H} = VDU^H \quad (3)$$

Here, the V and the U are M-row M-column unitary matrices, and the D is an M-row M-column diagonal matrix in which singular values of the third transmission/reception characteristic $\tilde{H}$ are diagonal elements. The suitable precoding weight matrix and the suitable postcoding weight matrix are thus determined as follows.

$$\begin{cases} P_{opt} = U \\ B_{opt} = V^H \end{cases}$$

As a result of the above determination, an eigenmode channel is formed on a MIMO transmission path, thus enabling the M number of streams to be separated from each other.

Alternatively or additionally to the weight matrix determination by singular value decomposition as described above, the suitable postcoding weight matrix can be determined based on an MMSE (least square error) criterion, as will be described below.

The suitable precoding weight matrix is determined by singular value decomposition in a manner similar to that described above. According to the MMSE criterion, the suitable postcoding weight matrix can be expressed as the equation (4) below.

$$B_{opt} = (\tilde{H} P_{opt} (\tilde{H} P_{opt})^H + \gamma^{-1} I)^{-1} (\tilde{H} P_{opt})^H \quad (4)$$

In equation (4), the γ is a reception SNR, and the I is an M-row M-column unit matrix.

In a case in which the suitable postcoding weight matrix is determined based on the MMSE criterion as described above, an error in estimating the third transmission/reception characteristic can be reduced by using the reception SNR. The suitable postcoding weight matrix can thus be determined more accurately.

Alternatively or additionally to determining the suitable precoding weight matrix and the suitable postcoding weight matrix as described above, precoding and postcoding based on a codebook, which is a conventional technology, may be used.

In this example, the determination of the suitable precoding weight matrix and the suitable postcoding weight matrix is executed in the small base station MMNB (precoding unit 32). The user apparatus UE is notified of the determined suitable postcoding weight matrix via the feedback unit 60.

1(3). Effect of Present Embodiment

According to the configuration of the embodiment described above, the weight matrices are determined stepwise for each stream. That is, the suitable transmission BF weight and the suitable reception BF weight are determined first, and the suitable precoding weight and the suitable postcoding weight are determined based thereon. The number of combinations that are to be operated is thus reduced compared with the configuration in which the weight matrices are determined by trying all the combinations of the weight matrices (transmission BF weight, reception BF weight, precoding weight, and postcoding weight). As a result, the suitable weight matrices can be determined while the operation amount needed for determining the weight matrices is reduced.

2. Modifications

The above embodiment can be modified in various ways. The following describes examples of specific modification modes. Any two or more modes selected from among the above embodiment and following modifications can be appropriately combined as long as there are no mutual inconsistencies.

2(1). Modification 1

In the above embodiment, communication of control information between the small base station MMNB and the user apparatus UE can be executed by a freely-chosen route. For example, in a case in which a radio link is established between the small base station MMNB and the user apparatus UE, the control information may be exchanged by directly transmitting and receiving radio signals. In a case in which the above radio link is not established, the small base station MMNB and the user apparatus UE may transmit and receive the control information via the macro base station MeNB.

2(2). Modification 2

In the above embodiment, when the suitable transmission BF weight vector that is to be used in the small base station MMNB is determined (S120 to S220), switching of the receiving antennas $A_R$ is executed in the user apparatus UE (S140 or S190). However, a configuration can be used in which the suitable transmission BF weight vector is determined using at least one fixed receiving antenna $A_R$, without the switching of the receiving antennas $A_R$ in the user apparatus UE. According to the above configuration, since the switching of the receiving antennas $A_R$ for each candidate reception BF weight vector is omitted, the processing load is reduced.

In the configuration in which the switching of the receiving antennas $A_R$ is not performed, however, there may be a case in which it is hard to obtain a transmission BF weight vector that is optimum due to a channel state. From a viewpoint of transmission quality, therefore, the configuration in which the switching of the receiving antennas $A_R$ is executed is preferable.

2(3). Modification 3

The above embodiment shows an example of a configuration in which a single receiving antenna $A_R$ is sequentially selected in determining of the suitable transmission BF weight vector. Multiple receiving antennas $A_R$ may, however, be selected at the same time. That is, in steps S140 to S190 in which the first transmission/reception characteristic is estimated for a single candidate reception BF weight vector, selection of n number of receiving antennas $A_R$ may be executed for $N_R/n$ number of times. Because the user apparatus UE includes processing circuits for M number of streams, up to M number of receiving antennas $A_R$ can be selected at the same time.

In the above configuration in which multiple receiving antennas $A_R$ are selected at the same time, the reception signals from the selected receiving antennas $A_R$ may be used independently, or may be used in combination. More specifically, in a case in which the reception signals are used independently, in a manner similar to that described in the aforementioned embodiment, the analog reception beamforming is executed for each receiving antenna $A_R$ based on the test reception BF weight matrix $$W_{R,test} = \begin{bmatrix} w_{R,opt,1}^T \\ \vdots \\ w_{R,opt,m-1}^T \\ 1_{n_r}^T \\ 0_{N_R}^T \\ \vdots \\ 0_{N_R}^T \end{bmatrix},$$

to estimate the first transmission/reception characteristic.

In a case in which multiple reception signals are combined by simple addition to be used, the analog reception beamforming is executed based on the test reception BF weight matrix $$W_{R,test} = \begin{bmatrix} w_{R,opt,1}^T \\ \vdots \\ w_{R,opt,m-1}^T \\ a^T \\ 0_{N_R}^T \\ \vdots \\ 0_{N_R}^T \end{bmatrix}$$

to estimate the first transmission/reception characteristic. Here, the a is an $N_R$-row 1-column vector in which components corresponding to indices of the selected receiving antennas $A_R$ are 1, and the other components are 0. For example, in a case in which the $n_{r1}$-th and the $n_{r2}$-th receiving antennas $A_R$ are selected, the $n_{r1}$-th component and the $n_{12}$-th component of the above vector are 1. A configuration can be used in which reception signals of the receiving antennas $A_R$ are weighted and combined. In this case, it is preferable to perform weighting on the reception signals based on the transmission quality.

2(4). Modification 4

A configuration can be used in which, after the BF weight vector is provisionally determined, the suitable BF weight vector is determined based on the provisionally determined BF weight vector. In this configuration, it is preferable that the provisionally determined BF weight vector is used as a reference and that the suitable BF weight vector is determined by performing detailed trials in a predetermined range centering on this reference (i.e., perturbation is executed). The above perturbation may be executed on one of the transmission side and the reception side, or may be executed on both sides.

2(5). Modification 5

In the above embodiment, transmission can be executed at the same time for M number of streams or less. The suitable BF weight vector is determined for each of the M number of streams. In another mode, instead of executing transmission always using all the M number of streams, the number of streams that are actually to be used may be adaptively selected based on the state of the transmission path, and transmission may be executed for the selected streams based on the suitable BF weight vectors that have already been determined.

2(6). Modification 6

In the above embodiment, the small base station MMNB is shown as an example of a transmitter, and the user apparatus UE is shown as an example of a receiver. In the aforementioned weight matrix determination, however, the user apparatus UE may function as a transmission side apparatus and the small base station MMNB may function as a reception side apparatus. That is, the aforementioned weight matrix determination may also be applied to uplink transmission.

2(7). Modification 7

In the above embodiment, the suitable BF weight matrices are determined for downlink transmission. In a case in which time division duplex (TDD) is used in the radio communication system 1, the same frequency is used for the uplink and the downlink. The suitable BF weight matrices determined for the downlink transmission can therefore be used for the uplink transmission. In a case in which frequency division duplex (FDD) is used in the radio communication system 1, after the suitable BF weight matrices are determined for the downlink transmission, the suitable BF weight matrices are also determined for the uplink transmission in a manner similar to that described in the aforementioned embodiment. Utilizing the beamforming gain, it is preferable that the suitable BF weight matrices are first determined for the transmission with the larger number of antennas for transmitting (i.e., the downlink transmission).

2(8). Modification 8

In the above embodiment, the suitable transmission BF weight (vector or matrix) is determined on the transmission side (small base station MMNB) and the suitable reception BF weight (vector or matrix) is determined on the reception side (user apparatus UE). Weight determination can, however, be executed in a freely-chosen location in the radio communication system 1. For example, the suitable reception BF weight may be determined on the transmission side, and the suitable transmission BF weight may be determined on the reception side.

In the above embodiment, the transmission side (small base station MMNB) determines the suitable precoding weight matrix and the suitable postcoding weight matrix. Alternatively, the reception side (user apparatus UE) may determine the suitable precoding weight matrix and the suitable postcoding weight matrix. Alternatively, a configuration can be used in which the transmission side determines the suitable precoding weight matrix and the reception side determines the suitable postcoding weight matrix.

2(9). Modification 9

The user apparatus UE is a freely-chosen apparatus that is capable of performing radio communication with the base stations (macro base station MeNB and small base station MMNB) in a network. The user apparatus UE may be, for example, a mobile phone terminal such as a feature phone or a smartphone, a tablet terminal, a desktop-type personal computer, a note-type personal computer, an UMPC (Ultra-Mobile Personal Computer), a portable game machine, or other radio terminals.

2(10). Modification 10

The functions executed by the CPUs in the elements (user apparatus UE and small base station MMNB) within the radio communication system 1 may be executed by hardware instead of the CPUs, or may be executed by a programmable logic device such as an FPGA (Field Programmable Gate Array) or a DSP (Digital Signal Processor).

DESCRIPTION OF REFERENCE SIGNS

1 . . . radio communication system; 10 . . . data signal generation unit; 20 . . . reference signal generation unit; 30 . . . baseband processing unit; 32 . . . precoding unit; 40 . . . DA conversion unit; 50 . . . RF processing unit; 52 . . . up-conversion unit; 54 . . . transmission beamforming unit; 60 . . . feedback unit; 70 . . . transmission BF weight control unit; 80 . . . storage unit; 110 . . . RF processing unit; 112 . . . reception beamforming unit; 114 . . . down-conversion unit; 120 . . . AD conversion unit; 130 . . . baseband processing unit; 132 . . . postcoding unit; 140 . . . signal analysis unit; 150 . . . transmission/reception characteristic estimation unit; 160 . . . reception BF weight control unit; 170 . . . feedback unit; 180 . . . storage unit; AA . . . amplitude adjuster; AC (ACT, ACR) . . . analog signal processing circuit; AD . . . adder; AR . . . receiving antenna; AT . . . transmitting antenna; C . . . channel capacity; CV (CVT, CVR) . . . converter; Cm . . . macro cell; Cmm . . . MM cell; DC (DCT, DCR) . . . digital signal processing circuit; MME . . . central control station; MMNB . . . small base station; MeNB . . . macro base station; MP . . . multiplier; PS . . . variable-phase shifter; RS . . . reference signal; SW . . . switching device; UE . . . user apparatus.

The invention claimed is:

1. A radio communication control method in a radio communication system including a transmitter and a receiver, the transmitter including:
   a precoding unit that performs digital precoding on M (where M is an integer of 2 or more) number of streams using a precoding weight matrix;
   a transmission beamforming unit that performs, on a signal on which the digital precoding has been performed, analog transmission beamforming that imparts, to the signal, changes in phase and amplitude corresponding to a transmission BF (beamforming) weight matrix; and
   multiple transmitting antennas that transmit the signal on which the analog transmission beamforming has been performed, the receiver including:
   multiple receiving antennas that receive a signal that is transmitted from the transmitter and is propagated through space;
   a reception beamforming unit that performs, on the signal received by the multiple receiving antennas, analog reception beamforming that imparts, to the signal received by the multiple receiving antennas, changes in phase and amplitude corresponding to a reception BF weight matrix; and
   a postcoding unit that reproduces the M number of streams by performing, using a postcoding weight matrix, digital postcoding on the signal on which the analog reception beamforming has been performed, the radio communication control method comprising:

for each of the M number of streams, selecting a candidate transmission BF weight vector corresponding to the stream from multiple transmission BF weight vector candidates;

transmitting, from the transmitter, a first reference signal on which analog transmission beamforming has been performed based on a candidate transmission BF weight matrix that includes the selected candidate transmission BF weight vector;

estimating a first transmission/reception characteristic that represents a result of performing, on the first reference signal that is received by the receiver, analog reception beamforming based on a test reception BF weight matrix;

determining a suitable transmission BF weight vector from the multiple transmission BF weight vector candidates based on multiple first transmission/reception characteristics acquired by executing the selecting, the transmitting, and the estimating for the multiple transmission BF weight vector candidates;

selecting a candidate reception BF weight vector corresponding to the stream from multiple reception BF weight vector candidates;

transmitting, from the transmitter, a second reference signal on which analog transmission beamforming has been performed based on a test transmission BF weight matrix that includes the determined suitable transmission BF weight vector;

estimating a second transmission/reception characteristic that represents a result of performing, on the second reference signal received by the receiver, analog reception beamforming based on a candidate reception BF weight matrix that includes the selected candidate reception BF weight vector; and determining a suitable reception BF weight vector from the multiple reception BF weight vector candidates based on multiple second transmission/reception characteristics acquired by executing the selecting, the transmitting, and the estimating for the multiple reception BF weight vector candidates.

2. The radio communication control method according to claim 1, wherein in determining the suitable transmission BF weight vector, the multiple first transmission/reception characteristics are estimated by sequentially selecting at least one of the receiving antennas to receive the first reference signal for each of the multiple transmission BF weight vector candidates.

3. The radio communication control method according to claim 1, wherein the suitable transmission BF weight vector is determined based on scalar values that represent features of the multiple first transmission/reception characteristics, and wherein the suitable reception BF weight vector is determined based on scalar values that represent features of the multiple second transmission/reception characteristics.

4. The radio communication control method according to claim 1, wherein a candidate transmission BF weight matrix corresponding to an m-th (m≥2) stream includes the suitable transmission BF weight vectors that correspond to an (m−1)-th stream and streams prior thereto and have already been determined, and wherein a candidate reception BF weight matrix corresponding to an m-th (m≥2) stream includes the suitable reception BF weight vectors that correspond to an (m−1)-th stream and streams prior thereto and have already been determined.

5. The radio communication control method according to claim 1, further comprising:

transmitting, from the transmitter, a third reference signal on which analog transmission beamforming has been performed based on a suitable transmission BF weight matrix that includes the suitable transmission BF weight vectors determined for the M number of streams;

estimating a third transmission/reception characteristic that represents a result of performing, on the third reference signal received by the receiver, analog reception beamforming based on a suitable reception BF weight matrix that includes the suitable reception BF weight vectors determined for the M number of streams, and determining a suitable precoding weight matrix and a suitable postcoding weight matrix based on the estimated third transmission/reception characteristic.

6. A radio communication system comprising a transmitter and a receiver, the transmitter including:

a precoding unit that performs digital precoding on M (where M is an integer of 2 or more) number of streams using a precoding weight matrix;

a transmission beamforming unit that performs, on a signal on which the digital precoding has been performed, analog transmission beamforming that imparts, to the signal, changes in phase and amplitude corresponding to a transmission BF (beamforming) weight matrix; and multiple transmitting antennas that transmit the signal on which the analog transmission beamforming has been performed, the receiver including:

multiple receiving antennas that receive a signal that is transmitted from the transmitter and is propagated through space;

a reception beamforming unit that performs, on the signal received by the multiple receiving antennas, analog reception beamforming that imparts, to the signal received by the multiple receiving antennas, changes in phase and amplitude corresponding to a reception BF weight matrix; and a postcoding unit that reproduces the M number of streams by performing, using a postcoding weight matrix, digital postcoding on the signal on which the analog reception beamforming has been performed, the radio communication system further comprising:

a transmission BF weight control unit that selects, for each of the M number of streams, a candidate transmission BF weight vector corresponding to the stream from multiple transmission BF weight vector candidates and directs the transmitter to transmit a first reference signal on which analog transmission beamforming has been performed based on a candidate transmission BF weight matrix that includes the selected candidate transmission BF weight vector; and a transmission/reception characteristic estimation unit that estimates a first transmission/reception characteristic that represents a result of analog reception beamforming performed on the first reference signal received by the receiver based on a test reception BF weight matrix, wherein the transmission BF weight control unit determines a suitable transmission BF weight vector from the multiple transmission BF weight vector candidates based on multiple first transmission/reception characteristics estimated by the transmission/reception characteristic estimation unit for the multiple transmission BF weight vector candidates, the radio communication system further comprising:

a reception BF weight control unit that selects, for each of the M number of streams, a candidate reception BF weight vector corresponding to the stream from multiple reception BF weight vector candidates, wherein the transmission BF weight control unit directs the transmitter to transmit a second reference signal on which analog transmission beamforming has been performed based on a test transmission BF weight matrix that includes the suitable transmission BF weight vector determined by the transmission BF weight control unit, wherein the transmission/reception characteristic estimation unit estimates a second transmission/reception characteristic that represents a result of analog reception beamforming performed on the second reference signal received by the receiver based on a candidate reception BF weight matrix that includes the candidate reception BF weight vector selected by the reception BF weight control unit, and wherein the reception BF weight control unit determines a suitable reception BF weight vector from the multiple reception BF weight vector candidates based on multiple second transmission/reception characteristics estimated by the transmission/reception characteristic estimation unit for the multiple reception BF weight vector candidates.

* * * * *